UNITED STATES PATENT OFFICE.

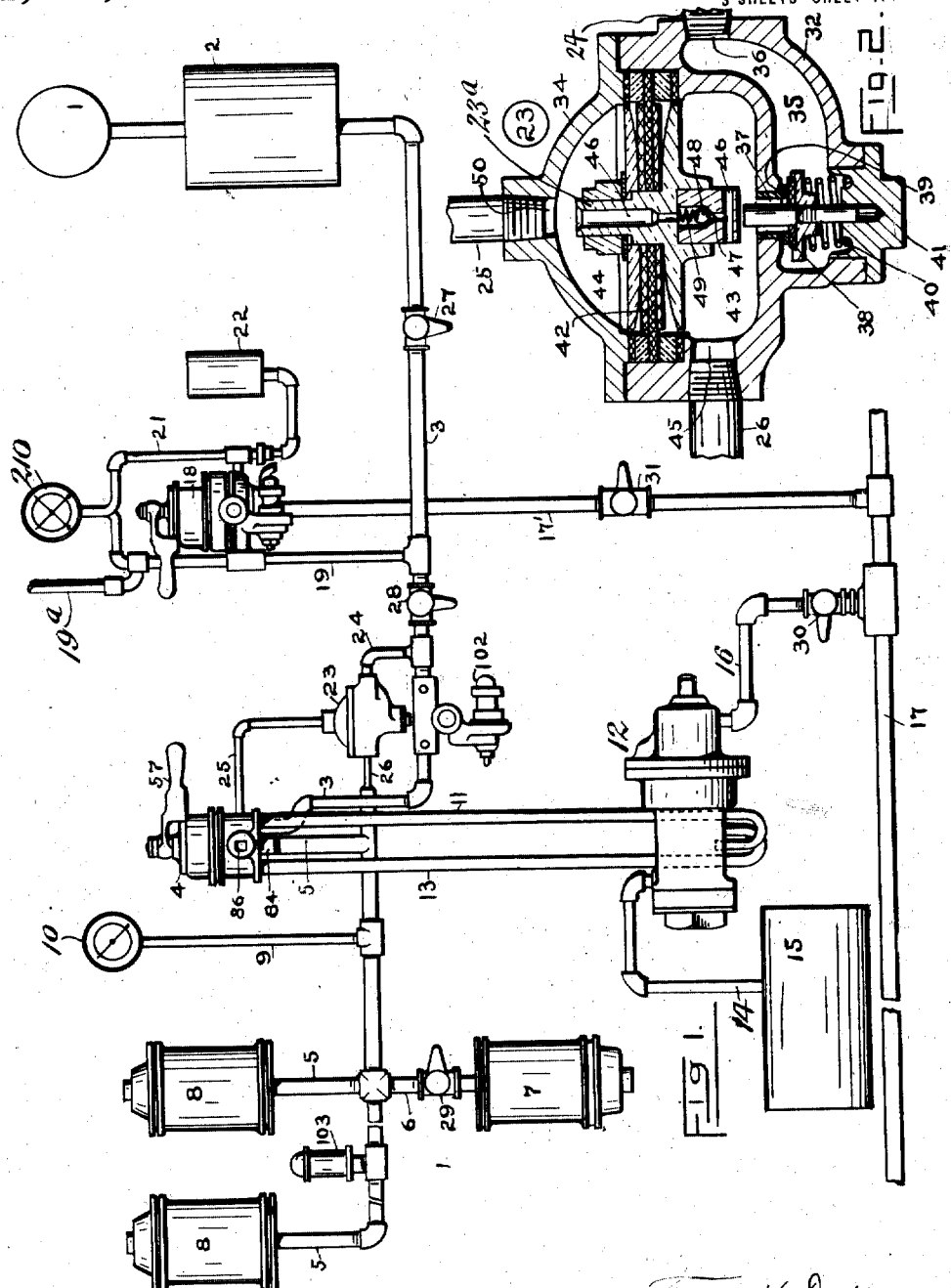

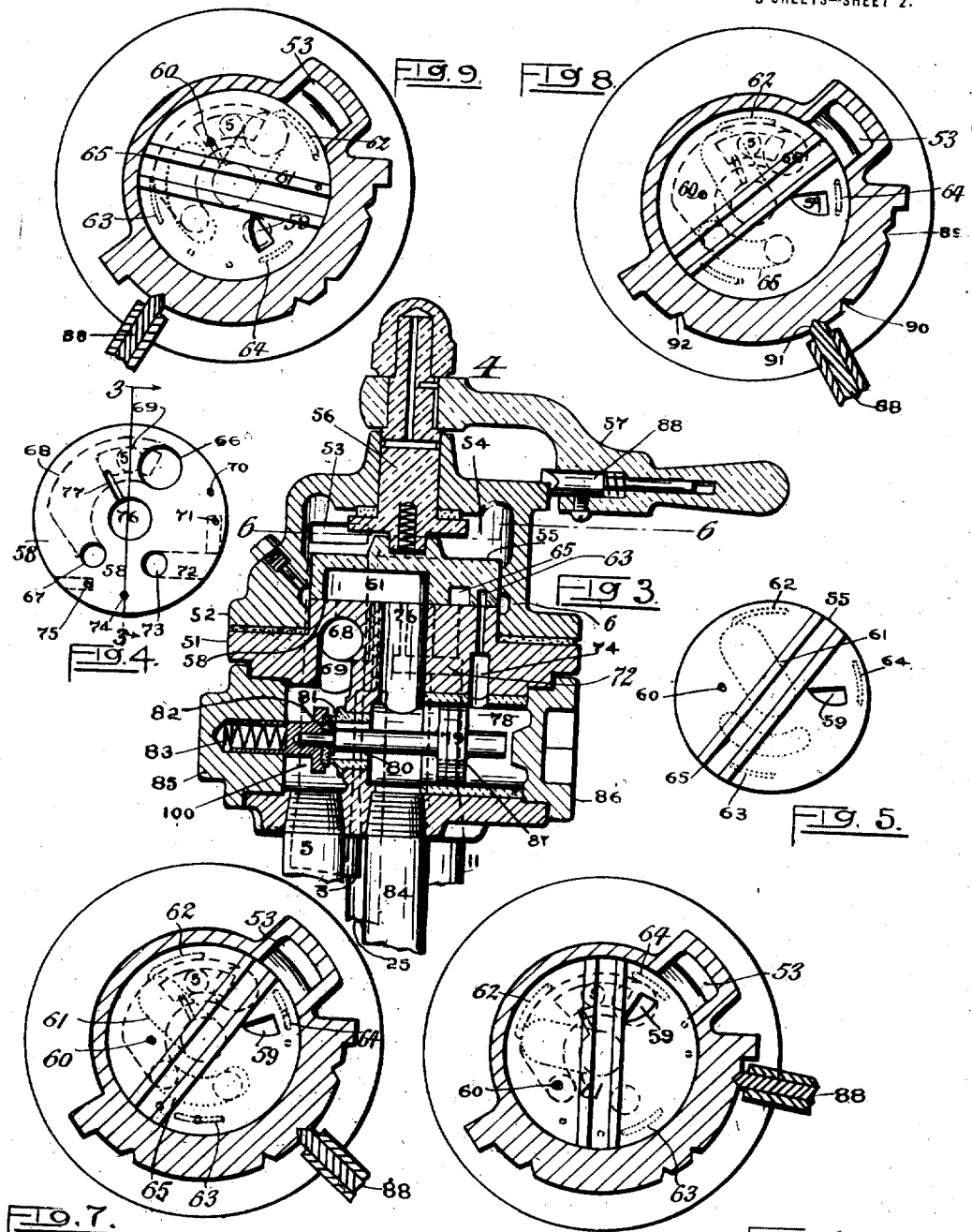

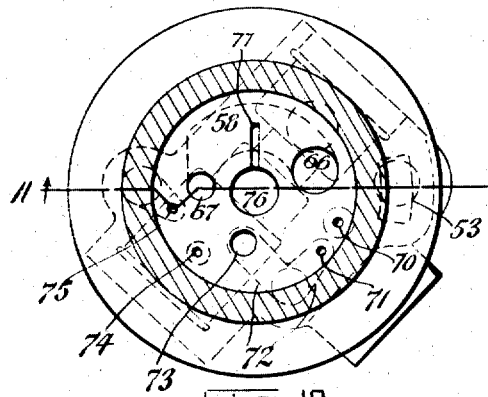
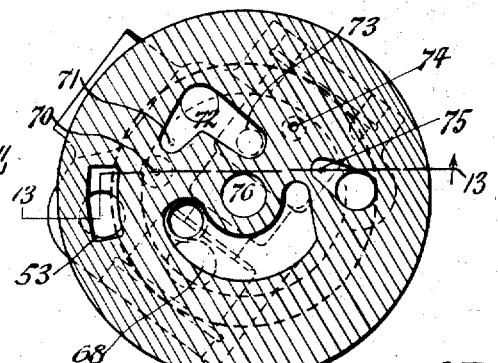
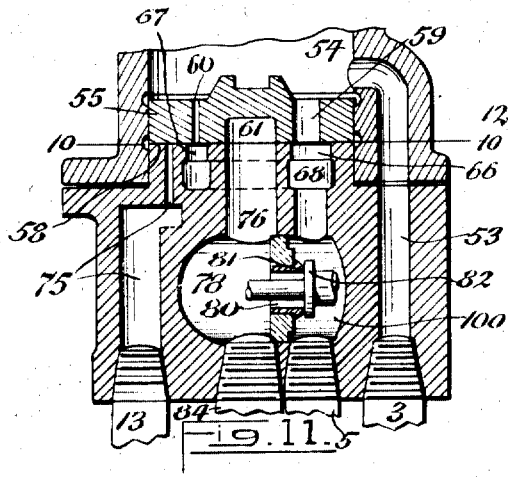
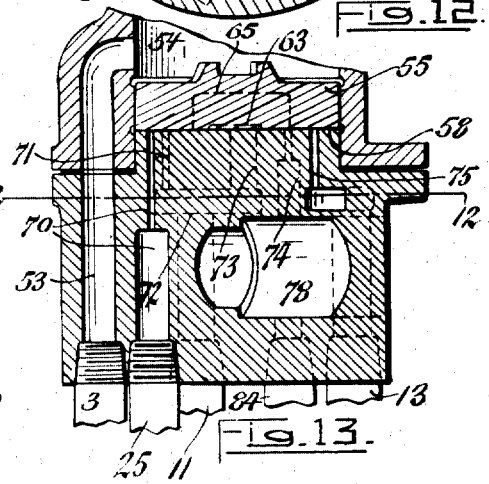
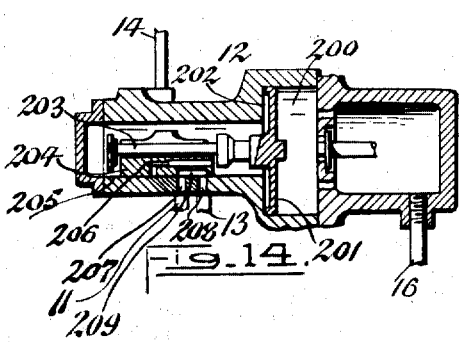

FRANK H. DUKESMITH, OF MEADVILLE, PENNSYLVANIA, ASSIGNOR TO THE RELIANCE AIR BRAKE COMPANY, INC., OF BUFFALO, N. Y., A CORPORATION OF NEW YORK.

AIR-BRAKE SYSTEM.

1,278,317.      Specification of Letters Patent.      Patented Sept. 10, 1918.

Application filed March 28, 1917. Serial No. 158,105.

*To all whom it may concern:*

Be it known that I, FRANK H. DUKESMITH, a citizen of the United States, residing at Meadville, in the county of Crawford and State of Pennsylvania, have invented new and useful Improvements in Air-Brake Systems, of which the following is a specification.

My invention relates to air brake systems, particularly in connection with brakes on locomotives and other self-propelled vehicles.

I have planned to improve the present method of controlling said brakes and especially to simplify the mechanism employed in the operation of said brakes, and to do so my object has been to provide an independent air brake system for locomotives that will do its work with as few parts as possible and will still be in harmony with the standard practices now employed in the air brake art.

The purpose of my airbrake system is to provide means that will afford alternate control of the locomotive and train brakes, and to give, in addition, a means whereby the brakes on the locomotive may be released either at the usual rate of exhaust employed in the regular automatic release of the brakes or very quickly, (as is done by my air brake system as shown in my Patent No. 1,064,224, dated June 10, 1913) and to do so without having to employ a cylinder exhaust valve and an auxiliary stop valve, as used in my air brake system just referred to.

To attain these objects I employ (aside from the usual air compressor and main reservoir) merely a standard engineer's automatic brake valve, a plain triple valve, an auxiliary reservoir, a brake cylinder, my improved independent brake valve and suitable piping connections to correlate these parts, together with an ordinary reducing valve and my improved maintaining valve device for the purpose of overcoming brake cylinder leakage. I have thus avoided the use of what is commonly known as a "distributing" valve, or the use of a retaining valve, an auxiliary stop valve and a cylinder exhaust valve as is employed in my air brake system patented on June 10, 1913. Furthermore, by employing the well known G-6 type of engineer's automatic brake valve, I have avoided the necessity of having to provide a new type of engineer's automatic brake valve in order to have my independent brake valve do its work of independently controlling the locomotive brakes.

In the accompanying drawings:

Figure 1 is a diagrammatic view showing the different elements of my improved air brake system shown in their operative relation. Fig. 2 is a sectional elevation, on an enlarged scale, of the maintaining valve which may form a part of my improved system. Fig. 3 is a vertical section, on an enlarged scale of the independent brake valve, showing the form in which the same may be embodied for accomplishing the purposes of my invention. Fig. 4 is a top plan view of the valve seat which coöperates with the movable member of the manually operated controlling valve which controls the flow of air from the main reservoir to the brake cylinders, from the brake cylinders to the atmosphere or retains the pressure within the pipe connections of the system. Fig. 5 is a top plan view of the movable valve member which coöperates with the valve seat shown in Fig. 4. Fig. 6 is a horizontal section taken on line 6—6, Fig. 3, showing the rotatable manually controlled valve member when the independent brake valve is in the application position. Figs. 7, 8 and 9 are sectional views similar to Fig. 6 showing the rotary member of the independent brake valve in the lap, running and quick release positions, respectively. Fig. 10 is a horizontal section taken on the correspondingly numbered line in Fig. 11. Fig. 11 is a fragmentary vertical section taken on line 11—11, Fig. 10. Fig. 12 is a horizontal section taken on line 12—12, Fig. 13. Fig. 13 is a fragmentary vertical section taken on line 13—13, Fig. 12. Figs. 14 and 15 are fragmentary vertical sections of the triple valve 12 showing the valve mechanism and its operating piston and slide-valve in different positions.

Similar characters of reference indicate corresponding parts throughout the several views.

In its general organization this air brake system comprises a pump 1 which is mounted on the locomotive and supplies compressed air. This pump may be of any suitable construction and is merely indicated diagrammatically in Fig. 1. This pump delivers compressed air into a main reservoir 2 and from the latter the air is delivered by means of a pipe 3 which may be provided with a cut-out cock 27 whereby the main reservoir may be cut off from the rest of the piping, if desired. 18 represents diagrammatically the usual engineer's automatic brake valve which is connected by pipe 19 with the pipe 3 beyond the cut-off cock 27 and also by pipe 17′, containing a cut out cock 31, with the train line pipe 17 leading to the brake mechanism of the cars which may be coupled with the locomotive. 22 represents the usual equalizing reservoir which is connected with the engineer's automatic brake valve. 210 is the usual duplex gage which shows the pressures usually carried in the main reservoir and in the train pipe on the locomotive and which is connected by a pipe 19 with the main reservoir pipe 3 and by-pipe 21 to the equalizing reservoir 22. 19ª is a pipe leading to the governor of the pump 1. 12 represents as a whole the usual plain triple valve commonly used on locomotives which is connected by a pipe 14 with the auxiliary reservoir 15 and also by a pipe 16 containing a cut-out cock 30 with the train line pipe 17. 7 represents the usual brake cylinder arranged on the tender of a locomotive and 8, 8 two brake cylinders which are usually mounted on each side of the engine. 5, 5 represents the air supply pipes leading to the brake cylinders 8, 8, and 6 is the supply pipe leading to the tender brake cylinder, which pipes are connected with each other and provided with a safety valve 103 whereby the pressure of the air may be automatically blown off when the same exceeds a predetermined pressure. If desired the pipe 6 leading to the tender brake cylinder 7 may be provided with a cut-out cock 29 of the usual and well known construction. The piping 5 and 6 may also be connected to a branch pipe 9 with a pressure gage 10 for the purpose of showing whatever pressure may be in the brake cylinders, on the engine and tender. 23 represents a pressure maintaining valve which is constructed in accordance with my invention and which may be employed in connection with this system. As shown, the same is connected by means of a pipe 24 with the outlet pipe 3 of the main reservoir and also by a pipe 26 with the brake cylinder piping or conduits.

4 represents generally the independent brake valve which embodies some features of my invention and which is connected by a pipe 25 with the maintaining valve 23, also by pipes 5 and 6 with the brake cylinders on the engine and tender, also by pipes 11 and 13 with the triple valve, also by a part of pipe 5 with the pipe 26 leading to the maintaining valve, and also with the pipe 3 of the main reservoir. 102 represents a reducing valve of usual construction which is connected with the pipe 3 between the main reservoir and the independent brake valve 4.

In its general organization the triple valve shown in Figs. 14 and 15 comprises a piston 201 arranged between the train line chamber 200 and the auxiliary reservoir chamber 202 of the triple valve casing 12 and provided with a stem 203 to which is attached a slide valve 204 having a cavity 209 which coöperates with ports 207 and 208 arranged in the seat 205 and connected respectively by pipes 11 and 13 with the independent brake valve. The slide valve 204 is also provided with a port 206 which is adapted to coöperate with the port 207 to permit auxiliary reservoir pressure which is always in chamber 202 to pass into the pipe 11 when the brakes are being applied automatically. The pipe 14 connects the chamber 202 with the auxiliary reservoir in the usual manner.

Although the pressure maintaining valve 23 may be variously constructed and still accomplish the purposes of this invention, the same preferably comprises a casing having lower and upper sections 32, 34 between which is arranged a movable diaphragm 42 carrying a stem 23ª and dividing the interior of the casing into an upper chamber 44 having an opening 50 which receives the pipe 25 and a lower chamber 43 having an opening 45 which receives the pipe 26. The lower section 32 of this casing is also provided with a passage 35 which has its inlet end 36 connected by pipe 24 with the main reservoir pipe 3 and it is also connected by a port 37 with the lower chamber 43. The lower end of the port 37 forms a valve seat 39 which is adapted to be engaged by a supply check valve 38 which is held yieldingly in its closed position by air pressure in the passage 35 and by a spring 40 bearing at its lower end on a plug 41 arranged in an opening in the lower side of the lower casing section 32. The stem 23ª is provided with an axial port or passage 46 containing a valve seat 47 which is adapted to be engaged by a controlling check valve 48 held yieldingly against its seat by a spring 49 and the air pressure in the chamber 44.

In its preferred form shown in the drawings the independent brake valve comprises a casing having lower and upper sections 51, 52 connected with each other in any suitable manner, an air chamber 54 arranged in the upper section and having an inlet 53 which connects with the pipe 3 leading to the main reservoir, a flat valve seat 58 arranged on the top of the lower casing section 51 and facing the chamber 54, a main exhaust outlet 76 arranged axially in the lower casing section 51 and opening at its upper end through the valve seat 58 while its lower end opens to the atmosphere, preferably through an exhaust nipple 84. The lower casing section 51 is also provided in its lower part with a chamber 78 the outer end of which is closed by a plug 86, the upper side thereof being provided with a passage or port 71 leading to the valve seat 58 and its inner end opening into the main exhaust channel 76.

The lower casing section 51 also contains a chamber 100 the outer side of which is closed by a plug 85, its lower side is connected with the pipe 5, its upper side communicates by means of a passage 69 with a cored passage 68 with two ports 66 and 67 which open into the valve seat 58 on practically diametrically opposite sides of the center of this seat; and its inner side connects by means of a port 80 with the main exhaust channel or outlet 76, as best shown in Figs. 8 and 11. Within the chamber 78 is arranged a reciprocating piston 79 containing a small vent port 87, extending through the same. 82 represents an automatic release valve arranged in the chamber 100 and adapted to engage a seat 81 around the port 80 and operated by connecting the same with the stem of the piston 79, also by air pressure in the chamber 100, and also by a spring 83 arranged between this valve and the plug 85. The lower casing section 51 also contains a passage 72 which connects at its lower end with the pipe 11 while its upper end connects with two ports 71 and 73 which open through the valve seat 58 on one side of its center but at different points circumferentially and also at different radial distances relatively thereto.

In the face of the seat 58 there is a groove 77 extending radially outward from the main exhaust channel 76. Opening through the valve seat 58 is a port 75 which connects at its lower end with the pipe 13. Another port 70 is arranged in the lower casing section 51 and opens at its upper end through the valve seat 58 while its lower end connects with the pipe 25.

Extending through both casing sections 51, 52 is a passage 53 which opens at its upper end into the chamber 54 while its lower end connects with the pipe 3.

Within the chamber 54 is a rotatable valve 55 preferably of disk form, which rests with its flat underside or face against the valve seat 58 and is adapted to rotate relatively thereto for bringing different ports, passages or cavities in this valve in different operating positions relatively to the ports in said valve seat 58. Any suitable means may be provided for manually rotating this disk valve into different positions, those shown in the drawings, for example, being preferred, and comprising an upright spindle or stem 56 journaled centrally in a suitable bearing in the upper casing section 52 and connected at its lower end with the valve 55 while its upper end is connected with a laterally projecting handle 57. For the purpose of holding this handle and the valve connected therewith in the various positions during the operation of the air brake system, a locking device is provided which preferably comprises a spring pressed dog or pawl 88 arranged in the handle 57 and adapted to engage one or another of a plurality of notches 89, 90, 91 and 92 formed in a quadrant on the outer side of the upper casing section.

On its underside or face this disk valve 55 is provided with a main exhaust cavity 61 extending from its center outwardly and permanently in communication at its inner end with the main exhaust channel 76, as shown for instance in Fig. 3. At its outer end the main exhaust cavity 61 is provided with a reduced extension groove 62 extending circumferentially relatively to the disk valve 55 and opening through the face on the underside thereof.

The underside of the disk valve 55 is also provided with a downwardly opening supply cavity 65 preferably of segmental form and arranged on the opposite side of the center of this valve relatively to the exhaust cavity 61. On the same side of this valve at a greater distance from its center than the cavity 65 is a groove 63 which also opens downwardly through the face of this disk valve. At another point circumferentially in this valve 55 and approximately at right angles to the grooves 63, 65 is another groove 64 which opens downwardly through the face of the valve 55. Extending through the valve 55 on one side of its center is a small port 60 and on the opposite side of this center a large port 59 also extends through this valve from the upper to the lower side of the same.

In operating my air brake system in connection with any of the standard locomotive air brake systems, I perform various functions with my independent brake valve according to whether or not the automatic brake is applied or released. For example, in my air brake system two brake valves are required on the locomotive one of which is known as the "engineer's automatic brake valve" and the other as the "independent brake valve," and should the engineer's automatic brake valve 18 be in what is known as "running position," Fig. 8, and the triple valve 12 is also in "running position," as shown in Fig. 14, then should it be desired to independently apply the locomotive brakes, this operation will be accomplished by placing the handle 57 of my independent brake valve 4 in its first or application position, as shown in Fig. 6, which causes reduced main reservoir pressure to pass from the main reservoir 2 through pipe connections 3 through the opening 53 into the chamber 54 and through the two ports 59 and 60 in the rotary valve 55 and through ports 66 and 67 in the valve seat 58 into cored passage 68, and thence through opening 69 into chamber 100 and into pipe 5 which leads directly to the brake cylinders 7, 8, 8, on the engine and tender. In this application position of the handle 57 of the independent brake valve 4, ports 74 and 75 which control the flow of air from the exhaust port 208 of the triple valve 12 to the control chamber 78 which contains the release piston 79 in the independent brake valve 4, are closed, thereby preventing any action of the automatic release valve 82. In this application position of the handle 57 of the independent brake valve 4, reduced main reservoir pressure (which is always in chamber 54 on top of the rotary valve 55) will continue to flow into the brake cylinders 8, 7 on the engine and tender, until the flow of air is automatically stopped by the closing of the reducing valve 102 that is located in the pipe 3 which leads from the main reservoir 2 to the engineer's independent brake valve 4. Should the pressure from the brake cylinders 7 and 8 leak out of said cylinders or their pipe connections while the handle 57 of the independent brake valve 4 is in its application position, the reducing valve 102 in the main reservoir pipe 3 will automatically continue to supply air through the independent brake valve 4 to the brake cylinders 7, 8 until the pressure is again restored to the pressure at which the reducing valve 102 is set.

When the handle 57 of the independent brake valve 4 is moved from its first or application position shown in Fig. 6, to its second or lap position shown in Fig. 7, the supply ports 59 and 60 through the rotary valve 55 are then disconnected from ports 66 and 67 in the rotary seat, which shuts off any further flow of reduced main reservoir pressure into the brake cylinders 7 and 8 on the engine and tender. The amount of air which will pass through the independent brake valve 4 while in its application position, is determined by the length of time the handle 57 is allowed to remain in that position, but i cannot exceed the pressure at which the reducing valve 102 is set. By moving the handle 57 of the independent brake valve 4 back and forth between application position and lap position, which manually controls the flow of air from the main reservoir to the both cylinders, the engineer is enabled to make either a light or a heavy application of the locomotive brakes as occasion may demand, and thus avoid the danger of shocking the train unnecessarily.

When the handle 57 of the independent brake valve 4 is in "lap position," as shown in Fig. 7, a groove 65 in the face of the rotary valve 55 connects ports 73 and 67 in the valve seat 58, thereby establishing communication between the triple valve supply pipe 11 and the brake cylinder pipe 5 which leads from the independent brake valve 4 to the brake cylinders 7, 8. But in this lap position of the independent brake valve 4 ports 74 and 75 in the valve seat 58 are not in communication with each other, neither are ports 70 and 71 in the valve seat in communication with each other. In this position of the independent brake valve 4, any air that may be in pipe 13 leading from the exhaust port 208 of the triple valve 12 is prevented from getting into the chamber 78 which contains the piston 79 of the automatic release valve 82, and therefore any operation of this release valve 82 is thereby prevented. In this lap position of the independent brake valve 4, port 70 in the valve seat 58 is closed, consequently no air is allowed to escape from the control chamber 44 of the maintaining valve 23 shown in Fig. 1. Therefore, during the time that the independent brake valve 4 is in its second or lap position, Fig. 7, any leakage of pressure from the brake cylinders 7, 8, on the engine and tender will be automatically overcome by pressure being supplied to them by way of the maintaining valve 23, which is connected to the brake cylinders by pipes 26 and 5 and by pipes 24 and 3 to the main reservoir 2. In lap position of the independent brake valve 4, the large exhaust cavity 61 in the face of the rotary valve 55 is blanked on the valve seat 58, thereby keeping the large exhaust port through the independent brake valve closed.

When the independent brake valve 4 is in its third or running position, as shown in Fig. 8, the supply ports 59 and 60 are still disconnected from ports 66 and 67 in the valve seat 58, and the large exhaust cavity 61 on the face of the rotary valve 55 is still blanked on the face of the valve seat 58 but the groove 64 in the face of the rotary valve 55 now connects ports 70 and 71 in the valve seat, so that the air that was previously confined in the control chamber 44 of the maintaining valve 23 is now free to pass out by way of the cored passage 72 to which port 73 in the valve seat 58 is connected, and thence through groove 65 in the face of rotary valve 55 into port 67 in the valve seat 58 into the cored passage 68 under the valve seat and out through the opening 69 into cylinder exhaust chamber 100 and thence through exhaust port 80 into the main exhaust channel 76 of the independent brake valve 4 to the atmosphere. This passage of air from the control chamber 44 of the maintaining valve 23 to the atmosphere is due to the fact that when the handle 57 of the independent brake valve 4 is placed in running position, as shown in Fig. 8, it causes the automatic release valve 82 to open in response to the back flow of brake cylinder pressure, because of the fact that when the independent brake valve 4 and the triple valve 12 are both in running positions, brake cylinder pressure passes through cored chamber 68 under the valve seat 58 up through port 67 in this seat and through groove 65 in the face of the rotary valve 55 down through port 73 in the valve seat 58, then by way of cored passage 72 into pipe 11, as shown in Fig. 1, to the triple valve 12, and when the triple valve is in its running position, as shown in Fig. 14, pressure from pipe 11 is free to pass through port 207 groove 209 and the exhaust port 208 in the triple valve 12 and thence through pipe 13 to port 75 in the valve seat 58 which is now connected by groove 63 in the face of the rotary valve 55 with port 74 in the valve seat 58 leading to the chamber 78 which contains the release piston 79 of the automatic release valve 82 and consequently, in running position of the independent brake valve 4, (and when the triple valve 12 is also in running position), air from the brake cylinders 7, 8, on the locomotive is permitted to escape to the atmosphere by way of the automatic release valve 82 at the usual rate of speed which is demanded by the automatic action of the brakes, and at the same time the maintaining valve 23 is estopped from automatically supplying air to the brake cylinders.

The fourth and last position of the independent brake valve 4 as shown in Fig. 9, is what is known as "quick release position". In this position of the independent brake valve 4, the large exhaust groove 61 in the face of the rotary valve 55 connects the large port 66 in the valve seat 58 with the main exhaust channel 76, which runs through the independent brake valve 4 to the atmosphere, thereby causing the brake cylinder pressure on the locomotive to be very quickly exhausted. In this position of the handle 57 of the independent brake valve, groove 62 in the face of the rotary valve connects port 70 in the valve seat 58 with the main exhaust outlet 64, 76, thereby releasing the pressure from the control chamber 44 of the maintaining valve 23, which causes this valve to assume its normal position and prevent any further opening of the supply valve 37, as shown in Fig. 2. When the handle 57 of the independent brake valve 4 is in quick release position, as shown in Fig. 9, port 60 through the rotary valve 55 is in communication with the groove 77 in the valve seat 58, thereby causing reduced main reservoir pressure to escape into the main exhaust channel 76, so that should the engineer leave the handle of the independent brake valve in this position after the brakes have been released, it will warn him of the fact that the handle should be returned to its running position, as shown in Fig. 8. When the handle of the independent brake valve is in quick release position, ports 75 and 74 in the valve seat 58 are disconnected, consequently in this position of the handle of the independent brake valve there is no action on the part of the automatic release valve 82, and all brake cylinder pressure that is exhausted while the handle is in this position must pass out to the atmosphere by way of the large port 66 in the valve seat 58, the cavity or groove 61 in the face of the rotary valve, and the main exhaust channel 76 extending directly through the independent brake valve to the atmosphere.

By referring to Fig. 7, it will be noted that when the handle 57 of the independent brake valve is in lap position, ports 73 and 67 in the valve seat 58 are placed in communication with each other by means of the groove 65 in the face of the rotary valve 55, consequently, should the triple valve 12 for any reason be moved to service position, as shown in Fig. 15, while the independent brake valve is in lap position, pressure from the auxiliary reservoir 12 would then be free to pass through the triple valve 12 by way of ports 206, 207 into the pipe 11, as shown in Fig. 1, to the independent brake valve 4 and by way of port 73 to the valve seat 58 and groove 65 in the face of the rotary valve 55 into port 67 in the valve seat 58 into the cored passage 68 below the valve seat and through opening 69 into chamber 100 which is always open to brake cylinder pipe 5 (Fig. 1) which is connected directly with the brake cylinders 7, 8 on the locomotive, and thereby cause the locomotive brakes to apply in the regular automatic manner. On pipe 5 there is located a safety valve 103 for the purpose of automatically blowing down any excessive pressure which should be inadvertently admitted to the brake cylinders 7 and 8. When the automatic operation of the locomotive brakes takes place, as just described, the movement of the slide valve 204 in the triple 12 automatically prevents any air from getting into port 208 and pipe 13 which leads from the exhaust port 208, of the triple 12 to port 75 in the valve seat 58 of the independent brake valve 4, and, besides, port 75 of the valve seat 58 is disconnected from port 74 in the valve seat 58, so that even should any air get into pipe 13 it could not reach the chamber 78 of the independent brake valve 4 which contains the release piston 79 of the release valve 82, and therefore could not cause the brakes to release themselves.

By reason of having two exhaust outlets 61 and 80 in the independent brake valve 4, an engineer is thereby enabled to cause the locomotive brakes to release slowly and gradually through exhaust port 80 or to release the brakes very quickly through exhaust cavity 61 and the main exhaust channel 76, as the requirements of the service may demand. He is thus enabled to permit the engine brakes to be released in any one of three ways: that is, he can graduate the release of the brakes a few pounds at a time, if desired, he can let them release gradually but continuously, or he can release them almost instantly.

Some further advantages of my air brake system are as follows:

First:—When the brakes on the locomotive and train have been applied in unison (as would be the case when the engineer's automatic brake valve 18 is used to apply the brakes, or as the result of the parting of the train pipe 17, Fig. 1), then should it be desired to reduce or entirely exhaust the brake cylinder pressure on the engine and tender, this function can be performed by simply placing the handle 57 of my independent brake valve 4 in its quick release position, as shown in Fig. 9, which permits a direct exhaust of brake cylinder pressure by way of pipe 5, chamber 100, opening 69, passage 68, port 66 in the valve seat 58, groove 61 in the face of the rotary valve 55 and main exhaust channel 76 to the atmosphere at nipple 84. By moving the handle 57 from quick release position, Fig. 9, to lap position, Fig. 7, it causes the rotary valve 55 to disconnect the main exhaust channel 76 from the brake cylinder port 66 in the valve seat 58, consequently, the engineer is thus enabled to manually control the exhaust of brake cylinder pressure by simply moving the handle 57 back and forth between quick release position and lap position.

Second:—After the locomotive brakes have been released, or partially released, (as stated in the above paragraph) then should the engineer desire to restore the brake cylinder pressure on the engine and tender without setting the train brakes any stronger than they are already set, he can do so by placing the handle 57 of the independent brake valve 4 to its application position, as shown in Fig. 6, which permits reduced main reservoir pressure (which is always in chamber 54, Fig. 3) to pass through ports 59 and 60 in the rotary valve 55 and through ports 66 and 67 in the valve seat 58 and thence through cored passage 68, opening 69, chamber 100 into pipe 5 which connects directly with the brake cylinders 7, 8. When the engineer has thus raised the brake cylinder pressure on the engine and tender to the desired amount, as shown on the cylinder gage 10, Fig. 1, then by returning the handle 57 of the independent brake valve 4 to its lap position, as shown in Fig. 7, it stops any further flow of reduced main reservoir pressure through the independent brake valve 4.

Third:—Should an undesired emergency application of the locomotive and train brakes occur, and, as a result, the locomotive brakes should cause the wheels on the locomotive to become locked, the engineer can almost instantly release the locomotive brakes without disturbing the train brakes, by simply placing the handle 57 of my independent brake valve 4 in its quick release position, which opens the brake cylinders on the engine and tender directly to the atmosphere by way of the large cavity 61 in the face of the rotary valve 55 and the main exhaust channel 76 as previously described. By reason of the fact that the triple valve 12 in my air brake system is not connected directly to the brake cylinders 7, 8, as is the common practice with other brake systems, the placing of handle 57 of the independent brake valve 4 in quick release position, Fig. 9, disconnects the triple valve supply pipe 13, Fig. 1, from the brake cylinder port 67 in the valve seat 58, and thereby prevents any pressure from flowing from the auxiliary reservoir 15 into the brake cylinders 7, 8 on the engine and tender. My arrangement of connecting the auxiliary reservoir 15, the triple valve 12 and the independent brake valve 4 together by direct pipe connections, avoids the necessity of employing any intermediary valve mechanism to shut off the flow of auxiliary reservoir pressure into the brake cylinders on the locomotive when a quick release of the locomotive brakes is being made.

Fourth:—In the handling of freight trains it is essential that all shock to merchandise and rolling stock be avoided as much as possible, consequently it is highly important that the brake mechanism on the locomotive should be constructed so that its independent functions or actions can be manually controlled by the engineer without having to depend upon the operation of intermediary valve mechanism between the independent brake valve and the brake cylinders, as is the case with the ordinary air brake systems now in use. Should it be desired to retard the movement of the locomotive prior to applying the train brakes, in order to permit the slack between the cars to run in against the engine and thereby avoid the danger of pulling the train in two or causing heavy shocks, the engineer can with my air brake system, independently apply the brakes on the locomotive with almost absolute precision, for the reason that when he places the handle 57 of the independent brake valve 4 in its application position, as shown in Fig. 6, he causes reduced main reservoir pressure to flow directly through the independent brake valve 4 to the brake cylinders on the engine and tender, and when he brings the handle 57 to its lap position, as shown in Fig. 7, he shuts off the flow of pressure into the brake cylinders 7, 8. This enables him to know for a certainty just how much and how fast the pressure is being built up in the brake cylinders 7, 8, on the locomotive.

Fifth:—By leaving the handle 57 of my independent brake valve 4 in its lap position, Fig. 7, after the brakes have been applied, either with the engineer's automatic brake valve 18 or with my independent brake valve 4, then should any pressure leak out from the brake cylinders 7, 8, the pressure in the brake cylinders will be automatically restored by the operation of my maintaining valve 23, Figs. 1 and 2, as follows:

When compressed air enters brake cylinder pipe 5, Fig. 1, it passes through pipe 26 into chamber 43, Fig. 2, of my maintaining valve 23, and thence through port 46 past the check valve 48 into chamber 44 on top of the diaphragm 42 and into pipe 25 to the valve seat 58 of the independent brake valve 4. Consequently, should brake cylinder pressure, which is always in chamber 43 of my maintaining valve 33 whenever the brakes are set, be reduced on account of leakage from the brake cylinders 7, 8, or their pipe connections, this reduction of brake cylinder pressure would cause the pressure which is confined above the diaphragm 42 to force the diaphragm stem 23ª down and engage the stem 37 of supply valve 39 and force it from its seat, thereby opening supply port 38 which admits main reservoir pressure, which is always in passage 35, that passage being always connected with the main reservoir pipes 24 and 3 at pipe connection 36. Therefore, when the supply valve 38 is off its seat, main reservoir pressure is free to pass through supply port 37 into chamber 43 and through opening 45 into pipes 26, 5 and 6, into the brake cylinders 7, 8, on the engine and tender, and the air will continue to flow from passage 35 into chamber 43 until the pressure in chamber 43 equalizes with the pressure in chamber 44 when the diaphragm stem 23ª will assume its normal position, as shown in Fig. 2, and thereby permit supply valve 38 to reseat and close supply port 37 and stop any further flow of pressure from passage 35 into chamber 43. As long as the handle 57 of the independent brake valve 4 is held in its lap position, there can be no escape of pressure from chamber 44 in my maintaining valve; consequently, while the handle 57 of the independent brake valve 4 is in lap position, my maintaining valve 23 will automatically continue to overcome leakage of pressure from the brake cylinders 7, 8 as long as there is any pressure in the main reservoir 2.

When the handle 57 of my independent brake valve 4 is placed in quick release position, as shown in Fig. 9, extension groove 62 in the face of the rotary valve 55 Fig. 5, connects with maintaining valve port 70 in the valve seat 58, thereby permitting pressure that was confined in chamber 44 of the maintaining valve 23 to exhaust to the atmosphere by way of groove 62, large exhaust cavity 61 and the main exhaust channel 76, which prevents any further action on the part of the maintaining valve 23 until the locomotive brakes have again been applied.

I claim as my invention:

1. An air brake system for locomotives or other self-propelled vehicles, comprising means for supplying compressed air, a main reservoir, an engineer's automatic brake valve, a triple valve, an auxiliary reservoir, a brake cylinder, an independent brake valve adapted by manual control of its ports to effect passages for the flow of compressed air to parts of said system and to the atmosphere and to retain said compressed air within said system parts, connections between said main reservoir, and brake cylinder, having within said connections a pressure reducing valve, and connections between said independent brake valve and said brake cylinder and the brake cylinder supply port of said triple valve, said independent brake valve having two separate exhaust outlets arranged to permit of a normal exhaust of the brake cylinder pressure and a quick exhaust of brake cylinder pressure.

2. An air brake system for locomotives or other self-propelled vehicles, comprising means for supplying compressed air, a main reservoir, an engineer's automatic brake valve, a triple valve, an auxiliary reservoir, a brake cylinder, an independent brake valve adapted by manual control of its ports to effect passages for the flow of compressed air to parts of said system and to the atmosphere and to retain said compressed air within said system parts, piping connections between said brake valves, main reservoir, brake cylinder, auxiliary reservoir, and triple valve, having within said connections a pressure reducing valve, and tubular connections between said independent brake valve and said brake cylinder and said triple valve, said tubular connections between said independent brake valve and said triple valve being so arranged that when an automatic application of the brakes is made, auxiliary reservoir pressure must pass from the triple valve to the brake cylinder by way of tubular connections leading from said triple valve to said independent brake valve.

3. An air brake system for locomotives or other self-propelled vehicles, comprising means for supplying compressed air, a main reservoir, an engineer's automatic brake valve, a triple valve, an auxiliary reservoir, a brake cylinder, an independent brake valve adapted by manual control of its ports to effect passages for the flow of compressed air to parts of said system and to the atmosphere and to retain said compressed air within said system parts, piping connections between said brake valves, main reservoir, brake cylinder, auxiliary reservoir, and triple valve, having within said connections a pressure reducing valve, and tubular connections between said independent brake valve and said brake cylinder and said triple valve, said independent brake valve having a valve seat, a port in said seat, a chamber, a passage and an inlet port leading to said chamber, a release piston arranged in said chamber, an exhaust port, a release valve controlling said exhaust port and operated by said piston as the result of pressure reaching said piston from the triple valve, said tubular connections between said triple valve and said independent brake valve being so arranged that when said independent brake valve is in running position and said triple valve is also in running position, brake cylinder pressure will be free to pass through the exhaust groove in the slide valve of said triple valve connecting said exhaust groove of said triple valve to a port in the valve seat of said independent brake valve and thence through said passage and inlet port into said chamber in said independent brake valve, so that the movement of said piston controls the opening of said release valve in said independent brake valve.

4. An air brake system for locomotives or other self-propelled vehicles, comprising means for supplying compressed air, a main reservoir, an engineer's automatic brake valve, a triple valve, an auxiliary reservoir, a brake cylinder, and an independent brake valve arranged in combination with the supply and exhaust ports of the triple valve so that the supply and the exhaust ports of said triple valve are directly controlled by the movement of the handle of said independent brake valve without regard to the operation of any intermediate valve mechanism between said independent brake valve and said triple valve.

5. An air brake system for locomotives or other self-propelled vehicles, comprising means for supplying compressed air, a main reservoir, an engineer's automatic brake valve, a triple valve, an auxiliary reservoir, a brake cylinder, an independent brake valve and a pressure maintaining valve for automatically supplying pressure to said brake cylinder to overcome leakages of pressure from said brake cylinder, said maintaining valve being so connected to said main reservoir, brake cylinder and independent brake valve that it will perform its maintaining function only when said independent brake valve is in lap or application position.

6. An air brake system for locomotives or other self-propelled vehicles, comprising means for supplying compressed air to said system, a main reservoir, an engineer's automatic brake valve, a triple valve, an auxiliary reservoir, a brake cylinder, and an independent brake valve connected to the supply and exhaust ports of said triple valve, said independent brake valve having its ports so arranged that by moving the handle of said independent brake valve to its quick release position, it will thereby prevent any flow of air from said auxiliary reservoir to said brake cylinder.

7. An air brake system for locomotives or other self-propelled vehicles, comprising means for supplying compressed air to said system, a main reservoir, an engineer's automatic brake valve, a triple valve, an auxiliary reservoir, a brake cylinder, and an independent brake valve having within the body thereof a release valve mechanism which operates in response to the brake cylinder pressure that reaches said release valve mechanism by way of the exhaust port of said triple valve.

8. An air brake system for locomotives or other self-propelled vehicles, comprising means for supplying compressed air to said system, a main reservoir, an engineer's automatic brake valve, a triple valve, an auxiliary reservoir, a brake cylinder, and an independent brake valve having two exhaust outlets, arranged in one position to admit compressed air into said brake cylinder, in another position to retain said compressed air within said system, in another position to cause the smaller of the exhaust outlets to be automatically opened when said triple valve is in its running or release position and in another position to open the larger exhaust outlet of said independent brake valve without causing the smaller exhaust outlet within said independent brake valve to open.

9. An air brake system for locomotives or other self-propelled vehicles, comprising means for supplying compressed air to said system, a main reservoir, an engineer's automatic brake valve, a triple valve, an auxiliary reservoir, a brake cylinder, a maintaining valve mechanism and an independent brake valve arranged in one position to close a port leading from the control chamber of said maintaining valve mechanism, and in one position to open said maintaining valve port to a port leading to the passages or conduits which communicate with said brake cylinder and in another position to open said maintaining valve mechanism port to the main exhaust channel of said independent brake valve.

FRANK H. DUKESMITH.